United States Patent [19]

Bronnes et al.

[11] Patent Number: 4,615,951

[45] Date of Patent: Oct. 7, 1986

[54] METALLIZED RARE EARTH GARNET AND METAL SEALS TO SAME

[75] Inventors: Robert L. Bronnes, Irvington, N.Y.; James K. McKinlay, Ridgefield, Conn.; Richard C. Sweet, North Tarrytown; Walter K. Zwicker, Scarborough, both of N.Y.

[73] Assignee: North American Philips Corporation, New York, N.Y.

[21] Appl. No.: 779,330

[22] Filed: Sep. 23, 1985

Related U.S. Application Data

[62] Division of Ser. No. 682,965, Dec. 18, 1984, Pat. No. 4,559,280.

[51] Int. Cl.[4] .............................................. B32B 15/04
[52] U.S. Cl. .................................... 428/615; 428/633; 252/62.57; 204/192.12
[58] Field of Search .............. 428/633, 615, 651, 652; 252/62.57

[56] References Cited

U.S. PATENT DOCUMENTS

| | | | |
|---|---|---|---|
| 3,503,721 | 3/1970 | Lupfer | 428/633 |
| 3,505,041 | 4/1970 | Bronnes et al. | 428/621 |
| 3,518,066 | 6/1970 | Bronnes et al. | 428/633 |
| 3,969,086 | 6/1976 | Vaquine et al. | 428/672 |
| 4,210,389 | 7/1980 | Burkhart et al. | 428/630 |
| 4,269,903 | 5/1981 | Clingman et al. | 428/652 |
| 4,485,150 | 11/1984 | Tsuno | 428/633 |
| 4,559,280 | 12/1985 | Bronnes et al. | 428/633 |

Primary Examiner—Veronica O'Keefe
Attorney, Agent, or Firm—John C. Fox

[57] ABSTRACT

A reliable garnet to metal hermetic seal is obtained by metallizing the garnet with successive sputtered layers of tantalum or titanium, molybdenum or tungsten and nickel, followed by soldering or brazing the metallized garnet to a metal member.

6 Claims, 2 Drawing Figures

4,615,951

METALLIZED RARE EARTH GARNET AND METAL SEALS TO SAME

This is a division of application Ser. No. 682,965, filed Dec. 18, 1984, U.S. Pat. No. 4,559,280.

BACKGROUND OF THE INVENTION

This invention relates to rare earth garnets, and more particularly relates to such garnets having a metallized bonding surface, and garnet to metal seals formed with this surface.

Rare earth garnets such as yttrium aluminum garnet (YAG) and yttrium indium garnet (YIG) exhibit unique optical and magnetic properties which make these materials useful in a variety of applications, such as magnetic bubble domain memory devices; magnetooptic devices, e.g., modulators, optic devices, e.g., lasers; and microwave devices, e.g., circulators. Often, the desired properties reside in an epitaxial single crystal layer supported on a polycrystalline substrate, and are achieved by complex substitutions of constituents into the garnet crystal structure.

The need to mount such devices to metal substrates such as walls or brackets presents a unique bonding problem. In addition to the known incompatibility between oxide and metal surfaces, the garnets themselves are often mechanically or chemically fragile. For example, in one application, the garnet is rectangular in shape, having an aspect ratio of about 6 to 1, thus giving rise to significant stresses due to differential thermal expansion in the body during heating. In addition, heating to temperatures above 400° C., necessary for most brazing operations, even for a short time, may cause irreversible changes in the magnetic or optical properties, especially of the thin epitaxial layer.

In U.S. Pat. No. 3,969,086, a garnet is metallized for bonding by sputter depositing a nichrome, molybdenum or chromium layer on the garnet, followed by a copper layer, and then a gold layer. The gold layer is then soldered to the metal to be bonded.

In U.S. Pat. No. 4,210,389, a YAG laser is first metallized with a sputtered reflective layer of aluminum, gold, silver or rhodium. This layer is then covered with a sputtered layer of either nichrome, titanium or tungsten, followed by a sputtered layer of gold or platinum. This gold or platinum layer is then soldered to a copper mount metallized with gold or platinum.

While the above structures apparently provide adequate garnet to metal seals, it is desirable to develop highly adherent, relatively cheap seals which do not rely upon the use of one or more precious metal layers.

Accordingly, it is an object of the invention to provide a metallized garnet suitable for soldering or brazing to a metal, the metallization for which is highly adherent to the garnet substrate and does not contain precious metals.

SUMMARY OF THE INVENTION

In accordance with the invention, a garnet is metallized with successive sputtered layers of: first, a highly reactive metal; second, a refractory metal barrier layer; and third, a solderable or brazable layer of a non-precious metal.

Also in accordance with the invention, a garnet to metal seal comprises a garnet metallized as described above, sealed to a metal member with a suitable solder or braze material. Such structures have been found to form highly reliable, adherent, hermetic seals.

DETAILED DESCRIPTION OF THE PREFERRED EMBODIMENTS

Figure 1:
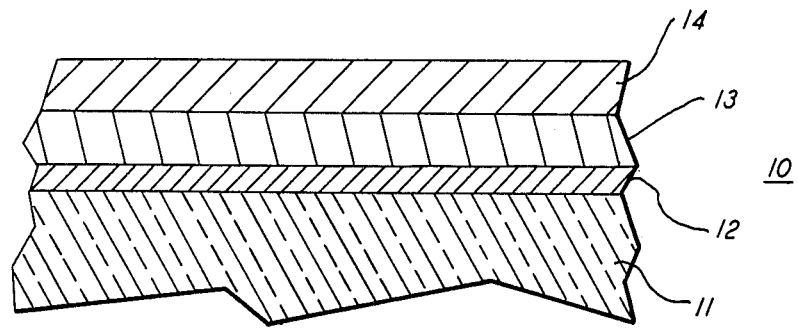
FIG. 1 is a section view of a portion of a garnet material metallized in accordance with the invention.

FIG. 1 shows a portion of a metallized garnet structure 10 in accordance with the invention, including garnet layer 11, reactive metal layer 12, barrier layer 13 and bonding layer 14.

Reactive metal layer 12 can be any one of, or an alloy of one or more of the metals tantalum, titanium, vanadium, hafnium, zirconium and niobium. When deposited by the diode sputtering technique described in U.S. Pat. No. 3,339,267, such layer forms a chemical bond with the non-metallic constituents in the substrate. Due to the high energy of bond formation of these metals, especially tantalum and titanium, this bond is tenacious and durable. However, because of their reactivity and the stability of their oxides, it is not practicable to solder or braze directly to these metals. Thus, a barrier layer 13, of a refractory metal such as molybdenum or tungsten, is sputter deposited on layer 12. This layer forms a tenacious metal to metal bond with reactive layer 12, but is itself relatively chemically inert. It thus acts as a barrier to protect the subsequent layers from attack by the reactive layer. It does not, however, due to its inertness, provide a strong bond with most solders and brazes. Thus, a solderable layer 14 of nickel is sputter deposited onto the refractory metal layer. Again, the sputter deposition technique referred to results in a strong, tenacious bond between these metal layers. Nickel is chosen as the solderable layer because it is more readily activated by fluxes than are more active solderable metals such as copper, and is notably less expensive than the precious metals, gold, silver, platinum and palladium.

The thickness of the layers deposited is not particularly critical, from one-half to one or several microns being adequate to provide a hermetic seal of reliable integrity. By way of example, one such seal has a layer of tantalum one-half micron in thickness, followed by layers of molybdenum and nickel, each about one micron in thickness.

Figure 2:
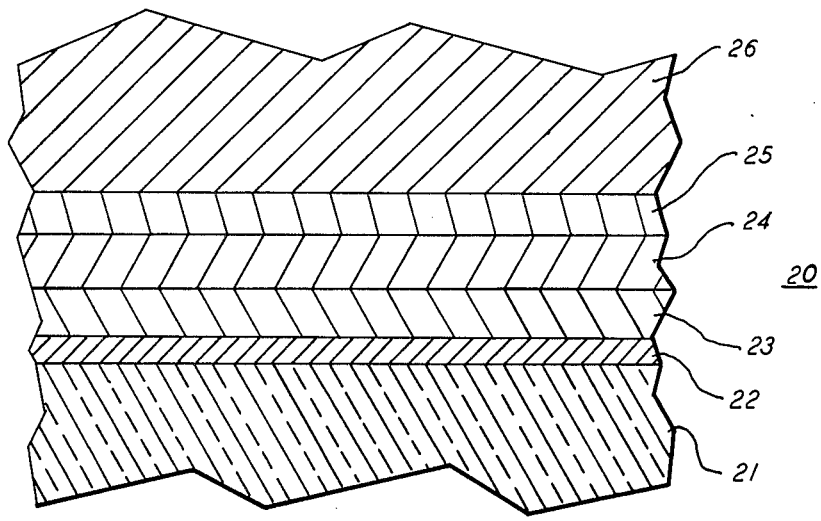
FIG. 2 is a section view of a portion of a garnet to metal seal formed from the metallized garnet of FIG. 1.

Any solder or braze compatible with the metal member to be bonded and otherwise suitable for the particular application, may be used. Typical solders are tin-silver, tin-lead, tin-bismuth, and indium-base alloys. FIG. 2 shows a garnet to metal seal 20, in which garnet layer 21 is bonded to metal layer 26, (e.g., titanium) by means of sputtered tantalum layer 22, sputtered molybdenum layer 23, sputtered nickel layer 24 and tin-silver solder layer 25.

While there have been shown and described what are at present considered to be the preferred embodiments of the invention, it will be obvious to those skilled in the art that various changes and modifications may be made therein without departing from the scope of the invention as defined by the appended claims.

We claim:

1. A metallized garnet comprising a body of garnet having a surface to be bonded, a first layer of a reactive metal sputter deposited on at least a portion of the garnet surface, a second layer of a refractory metal sputter deposited on the first layer, and a third layer of a solderable metal sputter deposited on the second layer.

2. The metallized garnet of claim 1 in which the reactive metal is selected from the group consisting of tantalum, titanium, vanadium, hafnium, zirconium, niobium and alloys thereof.

3. The metallized garnet of claim 1 in which the refractory metal is selected from the group consisting of molybdenum and tungsten.

4. The metallized garnet of claim 1 in which the solderable metal is nickel.

5. The metallized garnet of claim 1 in which the reactive metal is selected from the group consisting of tantalum and titanium, the refractory metal is molybdenum and the solderable metal is nickel.

6. The metallized garnet of claim 5 in which the first layer is about one-half micron in thickness and the second and third layers are each about one micron in thickness.

* * * * *